US010565422B2

(12) United States Patent
Zhou et al.

(10) Patent No.: US 10,565,422 B2
(45) Date of Patent: Feb. 18, 2020

(54) DISPLAY PANEL AND DISPLAY DEVICE (71) Applicant: Shanghai Tianma AM-OLED Co., Ltd., Shanghai (CN)

(72) Inventors: XingYao Zhou, Shanghai (CN); Yana Gao, Shanghai (CN); Yuan Li, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 70 days.

(21) Appl. No.: 16/059,249

(22) Filed: Aug. 9, 2018

(65) Prior Publication Data
US 2019/0332841 A1 Oct. 31, 2019

(30) Foreign Application Priority Data

Apr. 28, 2018 (CN) .......................... 2018 1 0401547

(51) Int. Cl.
G06K 9/28 (2006.01)
G06K 9/00 (2006.01)
G09G 3/22 (2006.01)
(52) U.S. Cl.
CPC ......... *G06K 9/0002* (2013.01); *G06K 9/0004* (2013.01); *G09G 3/22* (2013.01); *G06K 2009/0006* (2013.01)
(58) Field of Classification Search
CPC . H01L 27/32–27/3297; G09G 3/3208–3/3275; G06K 9/0004
See application file for complete search history.

(56) References Cited

U.S. PATENT DOCUMENTS

2015/0331508 A1* 11/2015 Nho ....................... G06F 3/0421
  345/173
2018/0005007 A1* 1/2018 Du ....................... H01L 27/3262
2018/0211088 A1* 7/2018 Cho ......................... G06K 9/22

FOREIGN PATENT DOCUMENTS

CN 103904099 A 7/2014

* cited by examiner

Primary Examiner — Brian Werner
(74) Attorney, Agent, or Firm — Tarolli, Sundheim, Covell & Tummino LLP (57) ABSTRACT The present disclosure provides a display panel and a display device. The display panel has a display area, and at least a part of the display area is a fingerprint recognition region. The display panel includes: a base substrate; a plurality of pixel circuits provided on the base substrate, each of which comprises a storage capacitor; and a plurality of fingerprint recognition units provided on a side of the storage capacitor facing away from a light-out surface of the display panel, and a projection of the plurality of fingerprint recognition units in a direction perpendicular to the base substrate is located within the fingerprint recognition region. The storage capacitor includes a first electrode and a second electrode disposed opposite to each other. At least one of the first electrode and the second electrode is a transparent electrode.

20 Claims, 5 Drawing Sheets

DISPLAY PANEL AND DISPLAY DEVICE

CROSS-REFERENCE TO RELATED APPLICATIONS

The present disclosure claims priority to Chinese Patent Application No. 201810401547.0, filed on Apr. 28, 2018, the content of which is incorporated herein by reference in its entirety.

TECHNICAL FIELD

The present disclosure relates to the field of display technologies, and in particular, to a display panel and a display device.

BACKGROUND

For a display panel with a fingerprint recognition function, in order to better achieve a full screen design and prevent a fingerprint recognition region from occupying space of a non-display area, currently, an under-screen fingerprint technology may be used to reuse a display area as the fingerprint recognition region. When the display area is reused as the fingerprint recognition region, a fingerprint recognition unit is provided in a part of the display panel corresponding to the fingerprint recognition region. When performing the fingerprint recognition, light emitted by a light source is reflected by a finger and then gets into the fingerprint recognition region, which in turn recognizes ridges and valleys of the fingerprint based on the received reflected light. However, with the current structure of the display panel, the light reflected by the finger has a low transmittance within the display panel, resulting in a small amount of reflected light received by the fingerprint recognition unit, thereby leading to the low detection accuracy.

SUMMARY

The present disclosure provides a display panel and a display device, which can improve the light transmittance of the display panel in the fingerprint recognition process, thereby improving the detection accuracy.

In one aspect, the present disclosure provides a display panel. The display panel has a display area, and at least a part of the display area is a fingerprint recognition region. The display panel includes: a base substrate; a plurality of pixel circuits provided on the base substrate, each of which includes a storage capacitor; and a plurality of fingerprint recognition units provided on a side of the storage capacitor facing away from a light-out surface of the display panel, and a projection of the plurality of fingerprint recognition units in a direction perpendicular to the base substrate is located within the fingerprint recognition region. The storage capacitor includes a first electrode and a second electrode disposed opposite to each other. At least one of the first electrode and the second electrode is a transparent electrode.

In another aspect, the present disclosure provides a display device including the abovementioned display panel.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. Obviously, the drawings described as follows are merely part of the embodiments of the present disclosure, other drawings can also be acquired by those skilled in the art without paying creative efforts.

DESCRIPTION OF EMBODIMENTS

For better illustrating technical solutions of the present disclosure, embodiments of the present disclosure will be described in detail as follows with reference to the accompanying drawings.

It should be noted that the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association describing associated objects, indicating that there may be three relationships, for example, "A and/or B" indicates three cases, i.e., only A existing, both A and B existing, and only B existing. In addition, the character "/" herein generally indicates that the associated objects form an "or" relationship therebetween.

It should be understood that although the electrode may be described using the terms of "first", "second", etc., in the embodiments of the present disclosure, the electrode will not be limited to these terms. These terms are merely used to distinguish electrodes from one another. For example, without departing from the scope of the embodiments of the present disclosure, a first electrode may also be referred to as a second electrode, and similarly, a second electrode may also be referred to as a first electrode.

Figure 1:
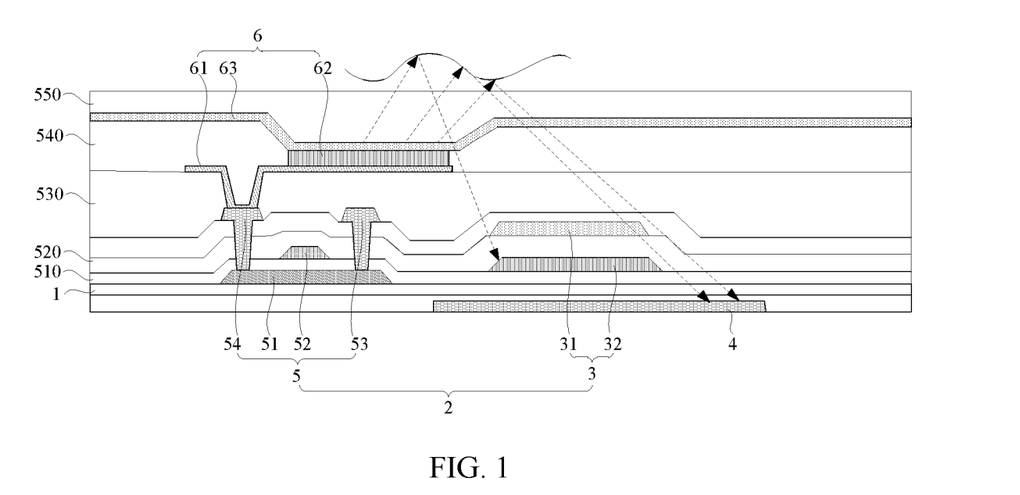
FIG. 1 is a schematic diagram of a film layer structure of a display panel according to an embodiment of the present disclosure.
Figure 2:
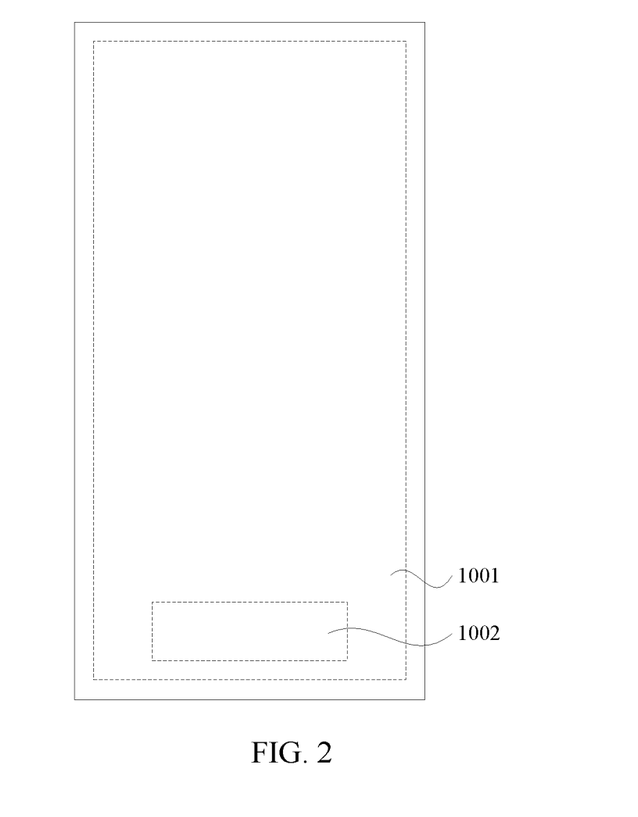
FIG. 2 is a top view of a display panel according to an embodiment of the present disclosure.

The present disclosure provides a display panel. As shown in FIG. 1, which is a schematic diagram of a film layer structure of a display panel according to an embodiment of the present disclosure, the display panel includes a base substrate 1. A plurality of pixel circuits 2 is provided on the base substrate 1, and each pixel circuit 2 includes a storage capacitor 3. As shown in FIG. 2, which is a top view of a display panel according to an embodiment of the present disclosure, at least a part of the display area 1001 of the display panel is used as a fingerprint recognition region 1002. With reference to FIG. 1 and FIG. 2, a plurality of fingerprint recognition units 4 is disposed on a side of the storage capacitor 3 facing away from the light-out surface of the display panel. A projection of the fingerprint recognition unit 4 in the direction perpendicular to the base substrate 1 is located within the fingerprint recognition region 1002. The storage capacitor 3 includes a first electrode 31 and a second electrode 32 disposed opposite to each other, and at least one of the first electrode 31 and the second electrode 32 is a transparent electrode. It should be noted that each storage capacitor 3 can respectively include the first electrode 31 and the second electrode 32.

For the display panel provided by an embodiment of the present disclosure, the fingerprint recognition unit 4 is disposed on a side of the storage capacitor 3 facing away from the light-out surface of the display panel, and at least one electrode of the storage capacitor 3 is a transparent electrode. Based on the transparency of the transparent electrode, during the fingerprint recognition process, after the light is reflected by the finger and then gets into the display panel, for a part of the reflected light that obliquely gets into the display panel, the part of the reflected light can pass through the transparent electrode of the storage capacitor 3 and then directly gets into the fingerprint recognition unit 4. Therefore, with the display panel provided by this embodiment of the present disclosure, the reflected light that is blocked by the electrodes of the storage capacitor 3 during the fingerprint recognition process can be decreased to a certain extent, and the transmittance of the reflected light in the display panel can be increased, such that the amount of reflected light received by the fingerprint recognition unit 4 can be increased and thus the detection accuracy of the fingerprint recognition can be improved.

It should be noted that in this embodiment, it is merely illustrative in FIG. 2 that only a part of the display area 1001 is reused as the fingerprint recognition region 1002. In other embodiments of the present disclosure, the entire display area can be reused as the fingerprint recognition region 1002, which will not be limited herein.

It should be understood that the abovementioned base substrate 1 can be a rigid substrate (such as a glass substrate), or a flexible substrate that is stretchable, foldable, bendable, or curlable. In the case that the base substrate 1 is a flexible substrate, the base substrate 1 may be made of polyimide (PI), polycarbonate (PC), polyether sulfone (PES), polyethylene terephthalate (PET), polyethylene naphthalate (PEN), polyarylate (PAR), glass fiber reinforced plastic (FRP) or other polymer materials. Then, the display panel is also stretchable, foldable, bendable, or curlable, such that it can be better applied to a display device having a curved surface. In addition, in an embodiment of the present disclosure, the base substrate 1 can be a transparent substrate, a semi-transparent substrate or an opaque substrate.

In addition, when at least a part of the display area 1001 is reused as the fingerprint recognition region 1002, the image display needs to be performed at the same time in the fingerprint recognition process. Since the spread angle of the display light is divergent, if the fingerprint recognition unit 4 is disposed on a side of the storage capacitor 3 facing toward the light-out surface of the display panel, the distance between the fingerprint recognition unit 4 and the light-out surface of the display panel will be short, which may lead to interference from the display light in the fingerprint recognition process. In an embodiment of the present disclosure, disposing the fingerprint recognition unit 4 on the side of the storage capacitor 3 facing away from the light-out surface of the display panel can increase the distance between the fingerprint recognition unit 4 and the light-out surface of the display panel, thereby avoiding the interference from the display light on the fingerprint recognition and thus improving the detection accuracy.

In addition, when the fingerprint recognition unit 4 is located on the side of the storage capacitor 3 facing away from the light-out surface of the display panel, for example, with further reference to FIG. 1, the fingerprint recognition unit 4 can be located on a side of the base substrate 1 facing away from the storage capacitor 3. In this case, the base substrate 1 can be a transparent substrate. In other embodiments of the present disclosure, the fingerprint recognition unit 4 can be located between the storage capacitor 3 and the base substrate 1, that is, on a side of the base substrate 1 facing toward the light-out surface of the display panel. In this case, the fingerprint recognition unit 4 is integrated in the display panel. Exemplarily, the fingerprint recognition unit can be integrated into a film layer in which a part of devices of the pixel circuit 2 of the display panel are located or a layer disposed separately in array layers of the display panel. It should be understood that the array layers according to this embodiment of the present disclosure can also be referred to as driving function layers. The array layers are located on a side of the base substrate 1 facing toward the light-out surface of the display panel, and at least a part of the pixel circuits 2 is located in the array layers.

In an example, with further reference to FIG. 1, the pixel circuit 2 includes a plurality of transistors 5 in addition to the storage capacitor 3. Each transistor 5 includes an active layer 51, a gate electrode 52, a first portion 53, and a second portion 54. In this embodiment, a top-gate transistor is taken as an example (in other embodiments of the present disclosure, the transistor may be a bottom-gate transistor). The array layers on the base substrate 1 includes an active layer 51, an interlayer insulating layer 510 covering the active layer 51, a gate electrode 52 disposed on a side of the interlayer insulating layer 510 facing away from the active layer 51, a gate insulating layer 520 covering the gate electrode 52, and a source-drain electrode layer disposed on a side of the gate insulating layer 520 facing away from the gate electrode 52. The source-drain electrode layer includes a first portion 53 and a second portion 54. In addition, a light-emitting element 6 such as an organic light-emitting diode is further provided on the base substrate 1. The light-emitting element 6 includes an anode 61, a light-emitting layer 62, and a cathode 63. The anode 61 is disposed on a side of the source-drain electrode layer facing away from the base substrate 1. A planarization layer 530 is disposed between the anode 61 and the source-drain electrode layer. The anode 61 is electrically connected to the second electrode 54 via a through hole in the planarization layer 530. A pixel defining layer 540 is disposed on a side of the planarization layer 530 facing away from the anode

61. The light-emitting layer 62 is located in an aperture of the pixel defining layer 540. The cathode 63 is disposed on a side of the pixel defining layer 540 facing away from the anode 61. An encapsulating layer 550 is disposed on a side of the cathode 63 facing away from the pixel defining layer 540.

In addition, it should be noted that the numbers of the transistor 5, the light-emitting element 6, and the fingerprint recognition unit 4 shown in FIG. 1 are only illustrative. In practical applications, the numbers of the transistor 5, the light emitting element 6, and the fingerprint recognition unit 4 can be selected according to actual needs, and will not be limited herein.

In an example, the transparent electrode of the storage capacitor 3 can be made of a transparent material having a high light transmittance such as indium tin oxide, indium zinc oxide, or indium gallium zinc oxide. The transparent electrode made of the abovementioned material can have a high light transmittance, thereby further increasing the transmittance of the reflected light.

In an example, both the first electrode 31 and the second electrode 32 of the storage capacitor 3 can be transparent electrodes, or one of the first and second electrodes can be a transparent electrode and the other one can be a metal electrode. Here, the metal electrode refers to an electrode made of an opaque metal material, and the metal electrode is opaque.

Figure 3:
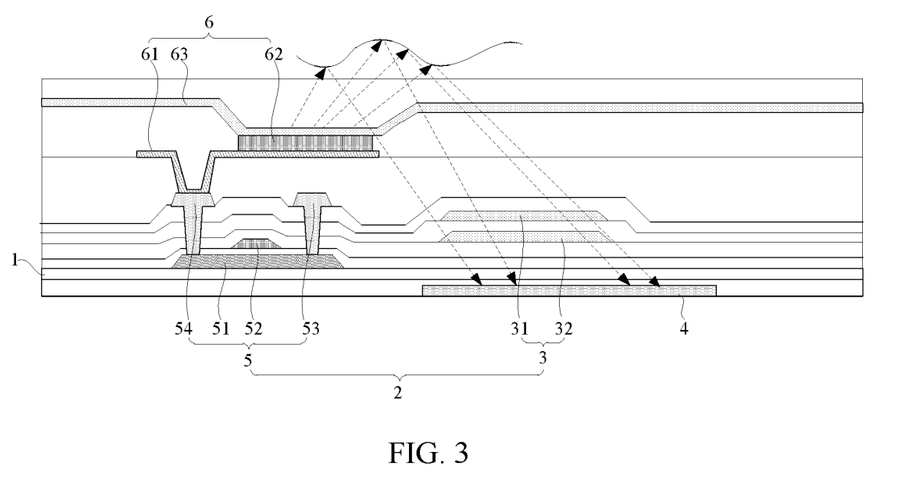
FIG. 3 is a schematic diagram of another film layer structure of a display panel according to an embodiment of the present disclosure.

As shown in FIG. 3, FIG. 3 is a schematic diagram of another film layer structure of a display panel according to an embodiment of the present disclosure. When the first electrode 31 and the second electrode 32 are both transparent electrodes, the entire storage capacitor 3 is in a light transmittance structure. In this case, during the fingerprint recognition process, no matter which spread angle the reflected light is to get into the storage capacitor 3, the reflected light can be emitted from the first electrode 31 and/or the second electrode 32, such that the amount of the reflected light received by the fingerprint recognition unit 4 can be greatly increased, and thus the detection accuracy of the fingerprint recognition can be improved.

It should be noted that since the transparent electrode is made of a transparent material and cannot reuse other metal layers, when the first electrode 31 and the second electrode 32 of the storage capacitor 3 are both transparent electrodes, the transparent electrode layers in which the first electrode 31 and the second electrode 32 are disposed are in different layers from the metal layers in which other structures of the display panel are located.

With further reference to FIG. 1, for example, the first electrode 31 is a transparent electrode and the second electrode 32 is a metal electrode. When one electrode is a transparent electrode and the other electrode is a metal electrode, on one hand, the metal electrode can reuse the metal layer in which another structure of the display panel is located. As a result, it is only needed to add one transparent electrode layer in the display panel, which can save an additional film layer and reduce process steps, thereby simplifying the process flow and reducing a thickness of the display panel. On the other hand, since the transparent material has a large resistance, when only one electrode is a transparent electrode, this can prevent the overall resistance of the storage capacitor 3 from being too large, thereby allowing the storage capacitor 3 to operate normally.

Figure 4:
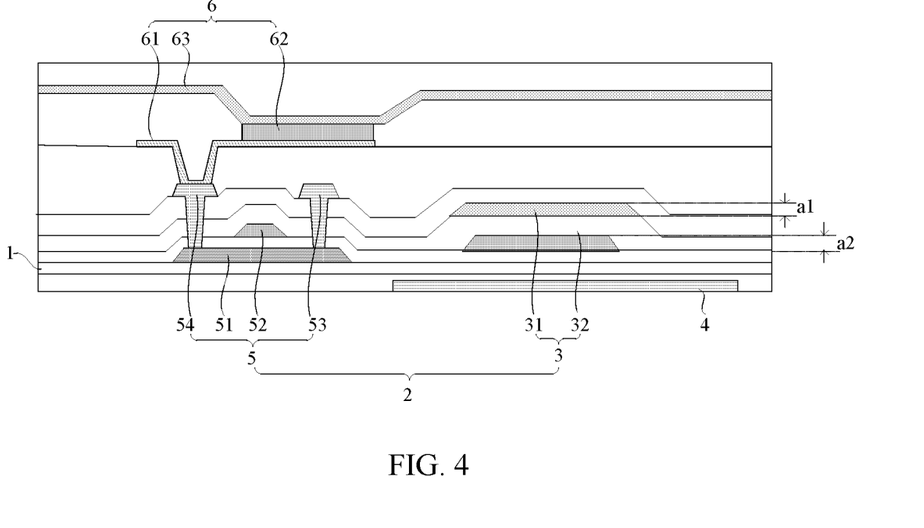
FIG. 4 is a schematic diagram of still another film layer structure of a display panel according to an embodiment of the present disclosure.

When one electrode of the storage capacitor 3 is a transparent electrode and the other electrode is a metal electrode, for example, as shown in FIG. 4, which is a schematic diagram of still another film layer structure of a display panel according to an embodiment of the present disclosure. The first electrode 31 is a transparent electrode, the second electrode 32 is a metal electrode, and an orthogonal projection of the second electrode 32 on the base substrate 1 is located within an orthogonal projection of the first electrode 31 on the base substrate 1.

It should be understood that in the manufacturing process of the storage capacitor 3, it may be inevitable that the actual position of the electrode deviates from its standard position due to the misalignment. If the two electrodes have a same size, an overlapping area between the two electrodes will decrease when positions of the electrodes deviate from each other. As a result, the actual capacitance of the storage capacitor 3 is smaller than the standard capacitance. In an embodiment of the present disclosure, by making the size of the transparent electrode larger than the size of the metal electrode, even if the position of one electrode deviates, the overlapping area between the two electrodes does not change, thereby allowing the storage capacitor 3 to maintain its standard capacitance. In addition, since the transparent electrode has a light-transmitting property, even if the size of the transparent electrode is increased, the enlarged portion of the electrode would not block the reflected light, and thus would not influence the transmittance of the reflected light during the fingerprint recognition process.

In an example, with further reference to FIG. 4, the first electrode 31 is a transparent electrode, the second electrode 32 is a metal electrode, and the first electrode 31 is located on the side of the second electrode 32 facing away from the base substrate 1. After the light reflected by the finger gets into the display panel, the influence on the reflected light from the electrode of the storage capacitor 3 close to the finger is greater than the influence from the electrode of the storage capacitor 3 away from the finger. Therefore, compared with providing the second electrode 32 as a transparent electrode, providing the first electrode 31 close to the finger as a transparent electrode can increase the transmittance of the reflected light to a greater extent.

In addition, when the transparent electrode is made of a transparent material such as indium tin oxide, if the thickness of the transparent electrode in the direction perpendicular to the base substrate 1 is extremely large, the transparent material is prone to have problems such as etching residue. Therefore, in order to avoid etching residue, the thickness of the transparent electrode can be made smaller. Based on this, with further reference to FIG. 4, when the first electrode 31 is a transparent electrode and the second electrode 32 is a metal electrode, the thickness a1 of the first electrode 31 in the direction perpendicular to the base substrate 1 can be made smaller than the thickness a2 of the second electrode 32 in the direction perpendicular to the base substrate 1.

In an example, 100 Å≤a1≤2000 Å, and 500 Å≤a2≤4000 Å. Setting the minimum value of a1 to be 100 Å can prevent the first electrode 31 from being too thin, which would otherwise adversely affect the normal operation of the storage capacitor 3. Setting the maximum value of a1 to 2000 Å can prevent the first electrode 31 from being too thick, which would otherwise result in etching residues in the transparent material.

In an embodiment of the present disclosure, other film layer structures in the display panel may be further adjusted after at least one electrode of the storage capacitor is provided as a transparent electrode. For a more intuitive understanding of other film layer structures in the display panel, the circuit structure of the pixel circuit 2, the connection relation and the operating principle thereof will be described in detail as follows by taking the pixel structure shown in FIG. 5 as an example.

Figure 5:
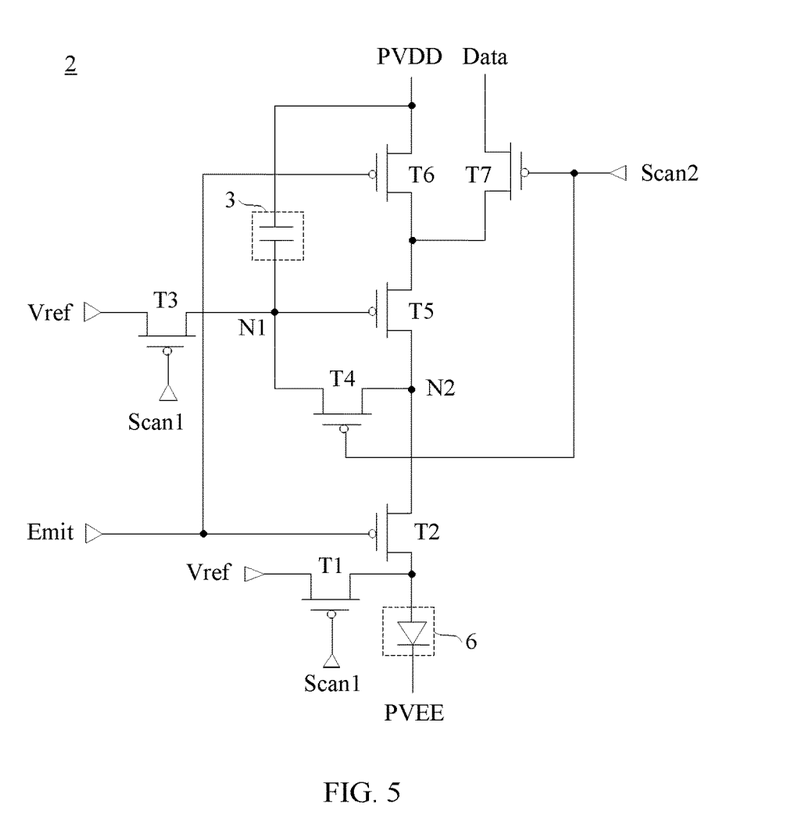
FIG. 5 is a schematic structural diagram of a pixel circuit according to an embodiment of the present disclosure.

As shown in FIG. 5, FIG. 5 is a schematic structural diagram of a pixel circuit according to an embodiment of the present disclosure. The pixel circuit 2 includes a storage capacitor 3 and first to seventh transistors T1 to T7. The first transistor T1 and the third transistor T3 each include a gate electrode connected to a first scan line Scan1. The fourth transistor T4 and the seventh transistor T7 each include a gate electrode connected to a second scan line Scan2. The second transistor T2 and the sixth transistor T6 each include a gate electrode connected to a light-emitting control signal line Emit. The sixth transistor T6 includes a first electrode connected to a fixed potential signal line PVDD. The seventh transistor T7 includes a first electrode connected to a data line Data. The first transistor T1 and the third transistor T3 each include a first electrode connected to an initial potential signal line Vref.

One driving cycle of the pixel circuit includes an initialization period, a data writing period, and a light-emitting period.

In the initialization period, the first scan line Scan1 provides a low-level, the second scan line Scan2 provides a high-level, the light-emitting control signal line Emit provides a high level, the first transistor T1 and the third transistor T3 are switched on, and an initial potential signal provided by the initialization potential signal line Vref is used to reset the node N1 and the anode of the light-emitting element.

In the data writing period, the second scan line Scan2 provides a low-level, the first scan line Scan1 provides a high-level, the light emission control signal line Emit provides a high-level, the fourth transistor T4, the fifth transistor T5 and the seventh transistor T7 are switched on, and a data signal provided by the data line Data is written into the second node N2.

In the light-emitting period, the first scan line Scan1 provides a high-level, the second scan line Scan2 provides a high-level, the light-emitting control signal line Emit provides a low-level, and the fifth transistor T5, the sixth transistor T6 and the second transistor T2 are switched on, such that the light-emitting element emit lights under the data signal.

Figure 6:
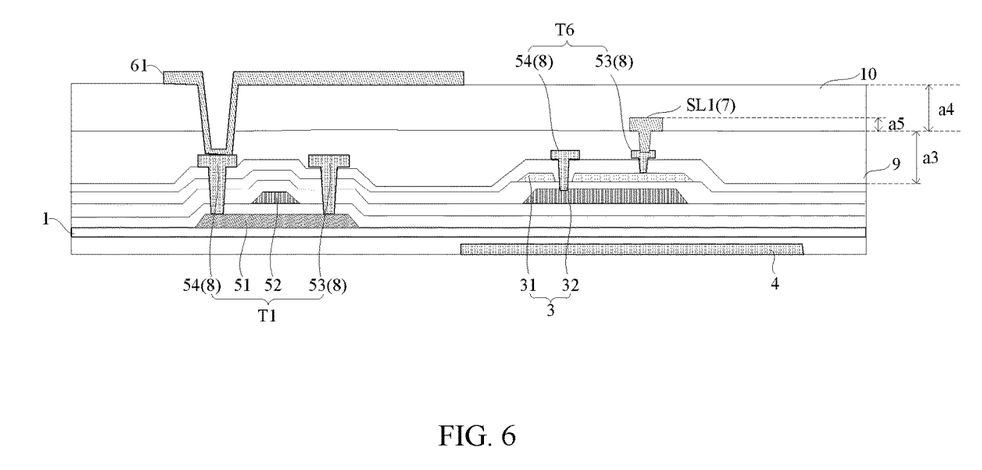
FIG. 6 is a schematic diagram of still another film layer structure of a display panel according to an embodiment of the present disclosure.

Based on the circuit structure shown in FIG. 5, FIG. 6 shows still another film layer structure of a display panel according to an embodiment of the present disclosure.

In an example, the storage capacitor 3 includes a first electrode 31 and a second electrode 32 disposed opposite to each other. It should be noted that in FIG. 6, the first electrode 31 is located on the side of the second electrode 32 close to the light-out surface of the display panel, and the first electrode 31 is a transparent electrode while the second electrode 32 is a metal electrode. However, in other embodiments of the present disclosure, all electrodes of the storage capacitor in the fingerprint recognition region can be transparent electrodes.

The display panel further includes a third metal layer 7. In this embodiment, since the first electrode 31 is a transparent electrode, the third metal layer 7 can be disposed on a side of the storage capacitor 3 close to the light-out surface of the display panel. The third metal layer 7 includes a first trace SL1 electrically connected to the transparent electrode (the first electrode 31), and the first trace SL1 is used to provide a signal of a fixed potential to the transparent electrode.

It should be understood that in the above embodiments, by way of example, the third metal layer 7 is disposed in such a manner that the electrode of the storage capacitor in the fingerprint recognition region close to the light-out surface of the display panel is a transparent electrode, and the electrode of the storage capacitor in the fingerprint recognition region away from the light-out surface of the display panel is a metal electrode. However, in other embodiments of the present disclosure, when the electrode of the storage capacitor in the fingerprint recognition region close to the light-out surface of the display panel is a metal electrode, and the electrode of the storage capacitor in the fingerprint recognition region away from the light-out surface of the display panel is a transparent electrode, for example, the third metal layer is located on a side of the storage capacitor 3 facing away from the light-out surface of the display panel.

In addition, it should also be noted that T1 shown in FIG. 6 corresponds to the first transistor T1 in the pixel circuit 2 shown in FIG. 5, T6 shown in FIG. 6 corresponds to the sixth transistor T6 in the pixel circuit 2 shown in FIG. 5, and the first trace SL1 shown in FIG. 6 corresponds to a section of the fixed potential signal line PVDD electrically connected to the storage capacitor 3 and the first electrode 53 of the sixth transistor T6 shown in FIG. 5. In addition, "the first trace SL1 is electrically connected to the transparent electrode" as described above can indicate that the first trace SL1 is directly electrically connected to the transparent electrode or the first trace SL1 is indirectly electrically connected to the transparent electrode through the first electrode 53 of the sixth transistor T6. Moreover, the connection manner of the second electrode 54 of the sixth transistor T6 and the metal electrode shown in FIG. 6 is merely illustrative, and in practice, the second electrode 54 of the sixth transistor T6 can be indirectly connected to the metal electrode through the first electrode 53 and the second electrode 54 of the fifth transistor T5 and the fourth transistor T4.

According to an embodiment of the present disclosure, the first electrode 31 of the storage capacitor 3 is a transparent electrode, which can reduce the reflected light blocked by the electrode of the storage capacitor 3 in the fingerprint recognition process to a certain extent, and increase the transmittance of the reflected light, thereby improving the detection accuracy of the fingerprint recognition. Besides, the first trace SL1 in the third metal layer 7 is used to provide a signal of a fixed potential to the first electrode 31 of the storage capacitor 3, and the first trace SL1 is made of a metal material. Compared with the transparent material of the first electrode 31, the metal material has a smaller resistance. Therefore, this can reduce the resistance of the trace while increasing the transmittance of the reflected light, thereby reducing the attenuation of the signal of the fixed potential. In addition, if the trace for providing a signal of a fixed potential to the storage capacitor is disposed in the same layer as the first electrode, a thickness of the trace in the direction perpendicular to the base substrate may be limited by the thickness of the first electrode in the direction perpendicular to the base substrate. In this case, the first electrode cannot be too thick, which would otherwise result in an increase in the resistance of the trace. In the display panel provided by this embodiment of the present disclosure, the first trace SL1 is formed by an additional third metal layer 7, that is, the first trace SL1 and the first electrode 31 are disposed in different layers. Therefore, the thickness of the first trace SL1 perpendicular to the base substrate 1 does not need to face restrictions from the thickness of the first electrode 31. In this case, the thickness of the first trace SL1 can be made larger. With the increase in the thickness of the first trace SL1, the cross-sectional area of the first trace SL1 increases correspondingly. According to the formula of $R=\rho l/S$, the larger the cross-sectional area S of the first trace SL1 is, the smaller the trace resistance R of the first trace is. In this way, the signal attenuation of the signal of the fixed potential during transmission in the first trace SL1 may decrease, thereby enhancing the driving capability of the signal of the fixed potential to the pixel circuit 2.

In an example, with further reference to FIG. 6, when the thickness of the third metal layer 7 in the direction perpendicular to the base substrate 1 is a5, 4000 Å≤a5≤10000 Å. Setting the minimum value of a5 to be 4000 Å can allow the first trace SL1 to have a smaller trace resistance, thus reducing signal attenuation. Setting the maximum value of a5 to be 10000 Å can avoid an extremely large thickness of the display panel caused by an extremely large thickness of the third metal layer 7.

Moreover, in order to reduce the trace resistance of the first trace SL1 and reduce the signal attenuation, the third metal layer 7 can be made of a material with a low resistivity, such as aluminum, titanium, copper, or alloy including at least two of aluminum, titanium and copper.

With further reference to FIG. 6, the first transistor T1 includes an active layer 51, a gate electrode 52, and a second metal layer 8 sequentially stacked in a direction away from the base substrate 1. The second metal layer 8 includes a first portion 53 and a second portion 54. The second portion 54 is electrically connected to an anode 61 of the light-emitting element 6. The first portion 53 is electrically connected to the first trace SL1. The first portion 53 is a source electrode and the second portion 54 is a drain electrode; or the first portion 53 is a drain electrode and the second portion 54 is a source electrode.

In addition, the display panel can further include a passivation layer (not shown in the figures). For example, the passivation layer can be located on a side of the second metal layer 8 facing away from the base substrate 1, and the passivation layer can be made of an inorganic material such as silicon oxide or nitrogen.

The display panel can also include a planarization layer disposed on the passivation layer. The planarization layer can be made of an organic material such as acryl, polyimide (PI) or benzocyclobutene (BCB). The planarization layer has a planarization effect.

In an example, with further reference to FIG. 6, the planarization layer can include a first planarization layer 9 and a second planarization layer 10 sequentially disposed along a direction away from the base substrate. Here, the first planarization layer 9 is located on a side of the second metal layer 8 facing away from the base substrate 1, and the second planarization layer 10 is located on a side of the first planarization layer 9 facing away from the second metal layer 8. Moreover, the light-emitting element 6 includes an anode 61 disposed on a side of the second planarization layer 10 facing away from the first planarization layer 9, and the anode 61 is electrically connected to the second electrode 54 of the first transistor T1 via through holes in the second planarization layer 10 and the first planarization layer 9.

In an example, the third metal layer 7 can be disposed between the first planarization layer 9 and the second planarization layer 10. Since each of the first planarization layer 9 and the second planarization layer 10 is an organic layer with a large thickness, when the third metal layer 7 is disposed between the first planarization layer 9 and the second planarization layer 10, the second planarization layer 10 with a large thickness can easily cover the additional third metal line 7, which can facilitate increasing the thickness of the third metal line 7, thereby achieving a greater reduction of the trace resistance. In addition, the insulating layer (for example, the gate insulating layer, the interlayer insulating layer, and the passivation layer) of the array layers of the display panel is usually an inorganic film layer, while the array layers are provided with a plurality of organic film layers (for example, a planarization layer, a pixel definition layer) close to the light-out surface of the display panel. Besides, the planarization layer disposed between the array layers and the light-emitting layer 62 is closer to the storage capacitor 3, and an upper surface of the planarization layer is a flat surface. Therefore, even if a pattern of the first trace SL1 is added, the insulating layer (the second planarization layer 10 in this embodiment) covered on the pattern of the first trace will not form steps or undulations on the surface with the pattern of the first trace SL1, which can facilitate the subsequent manufacturing of the film layers and result in the structural stability of other film layers on the pattern of the first trace SL1, thereby avoiding a film layer problem caused by the third metal layer 7 or the first trace SL1. In combination with this embodiment, the electrode of the storage capacitor 3 close to the light-emitting layer 62 is a transparent electrode, and the distance between the transparent electrode and the first trace SL1 in the third metal layer 7 is smaller. This can decrease intervals of other conductive patterns, which can further facilitate the electrical connection between the first trace SL1 and the transparent electrode, thereby reducing the path required for signal propagation and reducing the voltage drop.

In an example, in order to make the planarization layer have a sufficient thickness and achieve a better planarization effect, when the thickness of the first planarization layer 9 in the direction perpendicular to the base substrate 1 is a3, and the thickness of the second planarization layer 10 in the direction perpendicular to the base substrate 1 is a4, it can satisfy that 1 µm≤a3≤3 µm and 1 µm≤a4≤3 µm.

In addition, the fixed potential signal line PVDD shown in FIG. 5 can be in a mesh structure. In this way, on the one hand, the fixed potential signal line PVDD can transmit a signal of a fixed potential to all the pixel circuits 2 in the display panel, and on the other hand, compared with a planar structure, the trace resistance of the fixed potential signal line PVDD can be reduced, such that the attenuation of the signal of the fixed potential during transmission can be reduced.

Figure 7:
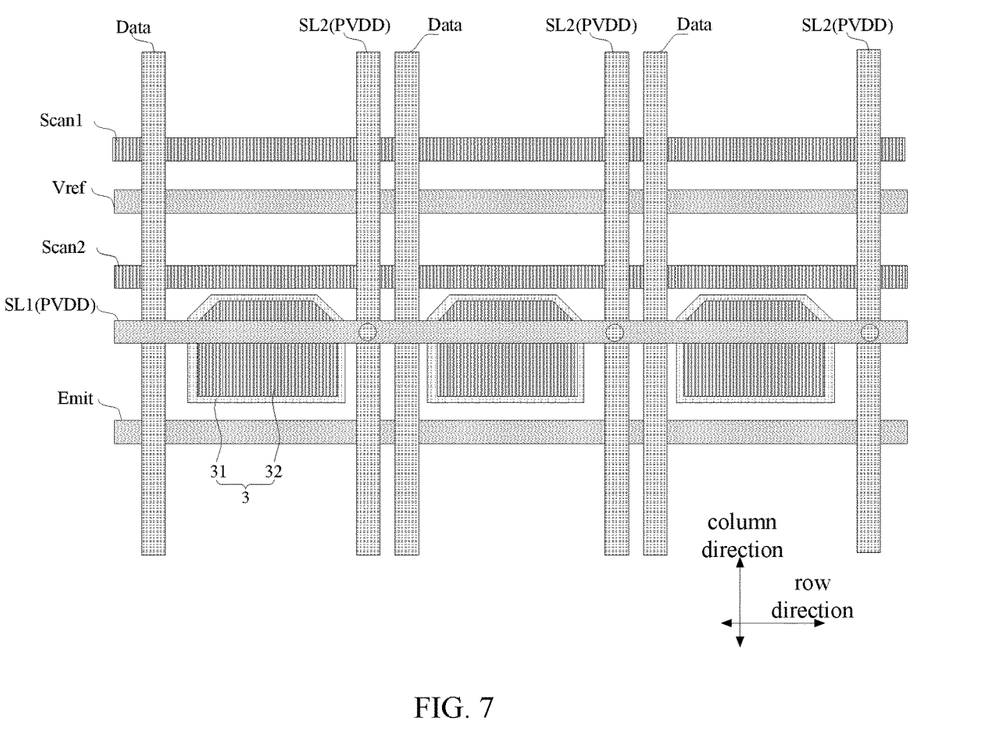
FIG. 7 is a top view of traces in a display panel according to an embodiment of the present disclosure.
Figure 8:
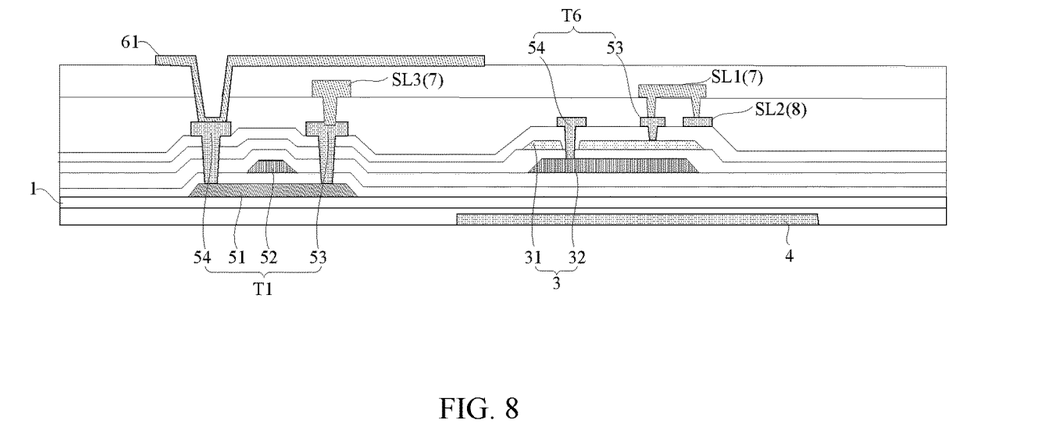
FIG. 8 is a schematic diagram of still another film layer structure of a display panel according to an embodiment of the present disclosure.

As shown in FIG. 7 and FIG. 8, FIG. 7 is a top view of traces in a display panel according to an embodiment of the present disclosure, and FIG. 8 is a schematic diagram of still another film layer structure of a display panel according to an embodiment of the present disclosure. The second metal layer 8 can further include a second trace SL2. The second trace SL2 is electrically connected to the first trace SL1. The second trace SL2 is used to transmit a signal of a fixed potential to the first trace SL1. The second trace SL2 extends along a first direction, and the first trace SL1 extends along a second direction. The first direction intersects with the second direction. Taking the directions shown in FIG. 7 as an example, the first direction is a column direction, and the second direction is a row direction.

It should be noted that the first trace SL1 reuses the third metal layer 7, and the second trace SL2 reuses the second metal layer 8. Thus, the second trace SL2 can be electrically connected to the first trace SL1 via a through hole.

As an example, the second trace SL2 reuses the second metal layer 8. In the manufacturing process of the display panel, the second trace SL2 can be formed by using the same patterning process as the first electrode 53 and the second electrode 54 of the transistor, thereby simplifying the process flow and reducing the manufacturing cost.

In an example, in order to simplify the process flow and reduce the manufacturing cost, when the first electrode 31 or the second electrode 32 is a metal electrode, the metal electrode and the gate electrode 52 of the transistor can be disposed in a same layer and made of a same material. For example, with further reference to FIG. 6, when the first electrode 31 is located on a side of the second electrode 32 facing away from the base substrate, the first electrode 31 is a transparent electrode, and the second electrode 32 is a metal electrode, the second electrode 32 and the gate electrode 52 can be in a same layer. With this arrangement, on the one hand, the first electrode 31 of the storage capacitor 3 close to the finger is a transparent electrode, which can greatly reduce the reflected light blocked by the electrode of the storage capacitor 3 in the fingerprint recognition process and increase the transmittance of the reflected light in the display panel; and on the other hand, the second electrode 32 of the storage capacitor 3 close to the array layers is a metal electrode, which makes it easier for the metal electrode to reuse a metal layer in the array layer.

It should be noted that in this embodiment, the metal electrode and the gate electrode 52 in the array layers are disposed in a same layer and made of a same material. However, in other embodiments of the present disclosure, it is also possible that the metal electrode and another metal layer in the array layers are disposed in a same layer and made of a same material, which will not be limited herein.

In an example, with further reference to FIG. 8, the third metal layer 7 can further include at least one third trace SL3. The third trace SL3 is electrically connected to the first electrode 53 of the first transistor T1, and is used to provide an initial potential signal to the first electrode 53. It should be noted that in combination with FIG. 5 and FIG. 8, the third trace SL3 shown in FIG. 8 corresponds to the initial potential signal line Vref shown in FIG. 5

In an example, the third trace SL3 reuses the third metal layer 7, so that there is no need to additionally add a film layer for forming the initial potential signal line. On one hand, the process flow can be simplified, the manufacturing cost can be decreased, and the thickness of the display panel can be decreased. On the other hand, since the thickness of the third metal layer 7 in the direction perpendicular to the base substrate 1 is large, so that the cross-sectional area of the third trace SL3 is large, so that the trace resistance of the third trace SL3 is small. As a result, the signal attenuation during transmission of the initial potential signal over the third track SL3 can be decreased, and the driving capability of the initial potential signal to the pixel circuit 2 can be enhanced.

In an example, the fingerprint recognition unit 4 can include a photosensitive element and a driving circuit connected to the photosensitive element. Here, the photosensitive element can be a photosensitive diode.

When the photosensitive element is a photosensitive diode, the photosensitive diode includes a transparent first electrode plate, a second electrode plate electrically connected to the driving circuit, and a PN junction disposed between the first electrode plate and the second electrode plate. During the fingerprint recognition process, the light reflected by the finger gets into the PN junction after passing through the first electrode plate. The PN junction has a photosensitivity property and has unidirectional conductivity. When no light gets into the PN junction, the PN junction has a small saturation reverse leakage current, i.e., a dark current, at which time the photosensitive diode is switched off. When there is light getting into the PN junction, the saturation reverse leakage current of the PN junction greatly increases, forming a light current. The distance between a ridge of the fingerprint and the photosensitive diode is different from the distance between a valley of the fingerprint and the photosensitive diode. Therefore, the reflected light formed at the position of the ridge and getting into the photosensitive diode has a different intensity from the reflected light formed at the position of the valley and getting into the photosensitive diode, and thus converted light currents have different magnitudes. In this way, fingerprint recognition can be performed according to the magnitudes of the converted light currents.

Further, during the fingerprint recognition process, the light getting into the touching body (such as a finger) can be light emitted from the light-emitting element 6 in the fingerprint recognition region, or can be light emitted from an additional light source.

When the light getting into the touching body is the light emitted from the light-emitting element 6 in the fingerprint recognition region, the light-emitting element 6 in the fingerprint recognition region is reused as a light source for fingerprint recognition. During the fingerprint recognition process, the light emitted from the light-emitting element 6 gets into the touching body, and then the touching body reflects the light to form a reflected light. Then the reflected light gets into the photosensitive element, and then the photosensitive element recognizes the fingerprint according to the reflected light.

Figure 9:
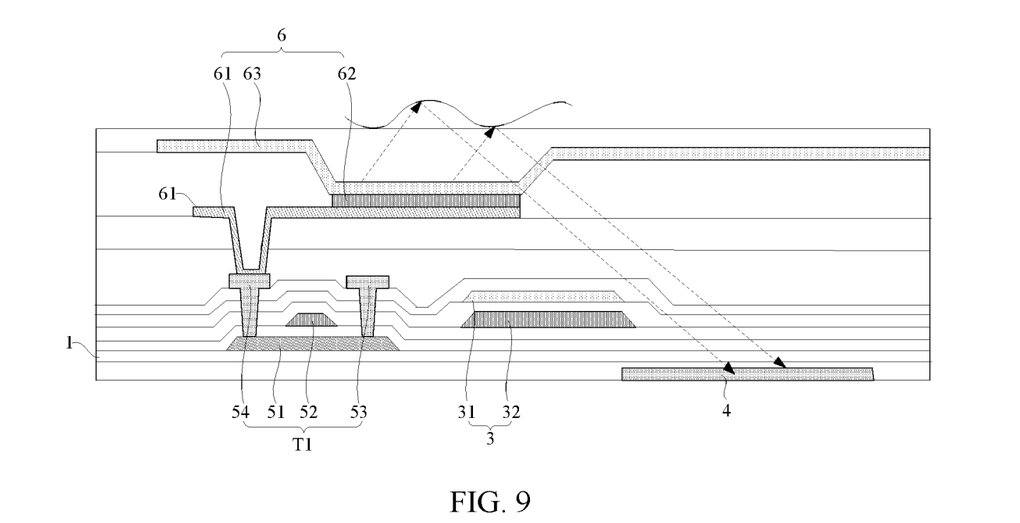
FIG. 9 is a schematic diagram of still another film layer structure of a display panel according to an embodiment of the present disclosure.

When the light-emitting element 6 in the fingerprint recognition region is reused as a light source for fingerprint recognition, for example, as shown in FIG. 9, which is a schematic diagram of still another film layer structure of a display panel according to an embodiment of the present disclosure, an orthogonal projection of the storage capacitor 3 on the base substrate 1 overlaps an orthogonal projection of the light emitting-element 6 on the base substrate 1. With this arrangement, an area of the transmission region of the reflected light can be increased, and thus the amount of reflected light received by the photosensitive element can be increased.

When the light getting into the touching body is the light emitted from the additional light source, the light source can be located on a side of the base substrate 1 facing away from the light-out surface of the display panel. During the fingerprint recognition process, after the light emitted from the fingerprint recognition light source gets into the touching body, the touching body reflects the light to form a reflected light, and then the reflected light gets into the photosensitive element and the photosensitive element recognizes the fingerprint based on the reflected light. For example, the external light source can be a miniature light-emitting diode.

Figure 10:
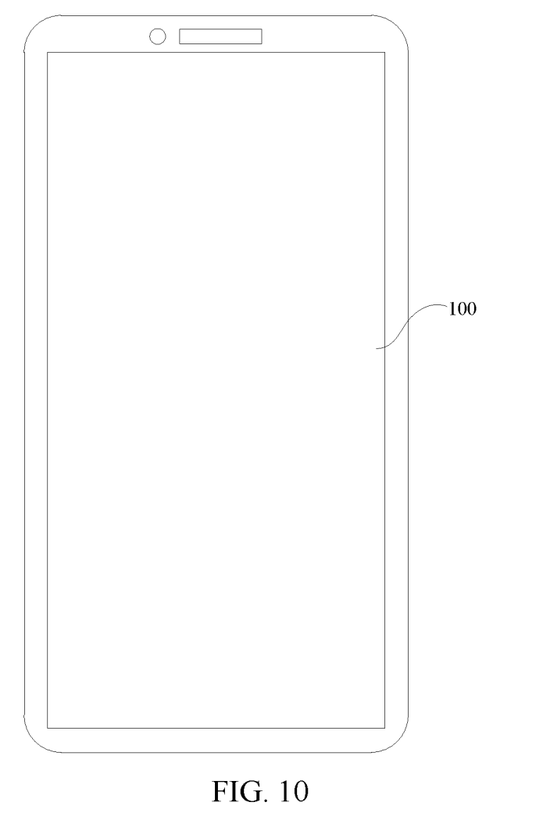
FIG. 10 is a schematic structural diagram of a display device according to an embodiment of the present disclosure.

The present disclosure further provides a display device. As shown in FIG. 10, FIG. 10 is a schematic structural diagram of a display device according to an embodiment of the present disclosure. The display device includes the abovementioned display panel 100. The structure of the display panel 100 has been described in detail in the above embodiments and will not be repeated herein. It should be noted that the display device shown in FIG. 10 is merely illustrative and the display device can be any electronic device having a display function, such as a cellphone, a tablet computer, a notebook computer, an electronic paper book, or a television set.

The display device provided by the present disclosure includes the abovementioned display panel. With this display device, the reflected light that is blocked by the electrode of the storage capacitor in fingerprint recognition process can be reduced to a certain extent, and the transmittance of the reflected light can be increased, which can increase the amount of the reflected light received by the photosensitive element and improve the detection accuracy of the fingerprint recognition.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:

1. A display panel, wherein the display panel has a display area, and at least a part of the display area is a fingerprint recognition region, the display panel comprising:
    a base substrate;
    a plurality of pixel circuits provided on the base substrate, wherein each of the plurality of pixel circuits comprises a storage capacitor; and
    a plurality of fingerprint recognition units provided on a side of the storage capacitor facing away from a light-out surface of the display panel, and a projection of the plurality of fingerprint recognition units in a direction perpendicular to the base substrate is located within the fingerprint recognition region,
    wherein the storage capacitor comprises a first electrode and a second electrode disposed opposite to each other, wherein at least one of the first electrode and the second electrode is a transparent electrode.

2. The display panel according to claim 1, wherein the first electrode is a transparent electrode, the second electrode is a metal electrode, and an orthographic projection of the second electrode on the base substrate is located within an orthographic projection of the first electrode on the base substrate.

3. The display panel according to claim 1, wherein the first electrode is a transparent electrode, the second electrode is a metal electrode, and the first electrode is located on a side of the second electrode facing away from the base substrate.

4. The display panel according to claim 1, wherein the first electrode is a transparent electrode, the second electrode is a metal electrode, and a thickness of the first electrode in the direction perpendicular to the base substrate is smaller than a thickness of the second electrode in the direction perpendicular to the base substrate.

5. The display panel according to claim 4, wherein the thickness of the first electrode in the direction perpendicular to the base substrate is a1, and 100 Å≤a1≤2000 Å; and wherein the thickness of the second electrode in the direction perpendicular to the base substrate is a2, and 500 Å≤a2≤4000 Å.

6. The display panel according to claim 1, wherein the display panel further comprises a third metal layer, the third metal layer comprises a first trace, and the first trace is electrically connected to the transparent electrode and is used to provide a signal of a fixed potential to the transparent electrode.

7. The display panel according to claim 6, wherein each of the plurality of pixel circuits further comprises a first transistor, and the first transistor comprises an active layer, a gate electrode, and a second metal layer disposed along a direction away from the base substrate; wherein the second metal layer comprises a first portion and a second portion; and wherein one of the first portion and the second portion is a source electrode, and the other one of the first portion and the second portion is a drain electrode;
    wherein a first planarization layer is provided on a side of the second metal layer facing away from the base substrate, and a second planarization layer is provided on a side of the first planarization layer facing away from the base substrate; and
    wherein the third metal layer is located between the first planarization layer and the second planarization layer.

8. The display panel according to claim 7, wherein the second metal layer further comprises a second trace;
    wherein the second trace is electrically connected to the first trace and is used to transmit a signal of a fixed potential to the first trace; and
    wherein the second trace extends along a first direction, the first trace extends along a second direction, and the first direction intersects with the second direction.

9. The display panel according to claim 7, wherein an anode of a light-emitting element is disposed on a side of the second planarization layer facing away from the base substrate, and the anode is electrically connected to the second portion via through holes in the second planarization layer and the first planarization layer.

10. The display panel according to claim 7, wherein a thickness of the first planarization layer in the direction perpendicular to the base substrate is a3, and 1 μm≤a3≤3 μm; and wherein a thickness of the second planarization layer in the direction perpendicular to the base substrate is a4, and 1 μm≤a4≤3 μm.

11. The display panel according to claim 7, wherein the first portion or the second portion is a metal electrode, and the metal electrode and the gate electrode are made of a same material and disposed in a same layer.

12. The display panel according to claim 6, wherein the third metal layer further comprises at least one third trace, and the third trace is electrically connected to the first portion and is used to provide a signal of an initial potential to the first portion.

13. The display panel according to claim 6, wherein a thickness of the third metal layer in the direction perpendicular to the base substrate is a5, and 4000 Å≤a5≤10000 Å.

14. The display panel according to claim 6, wherein the third metal layer is made of aluminum, titanium, copper, or an alloy comprising at least two of aluminum, titanium, copper.

15. The display panel according to claim 1, wherein the transparent electrode is made of indium tin oxide, indium zinc oxide or indium gallium zinc oxide.

16. The display panel according to claim 1, wherein both the first electrode and the second electrode are transparent electrodes.

17. The display panel according to claim 1, wherein each of the plurality of fingerprint recognition units comprises a photosensitive element and a driving circuit connected to the photosensitive element.

18. The display panel according to claim 17, wherein the photosensitive element is a photosensitive diode.

19. The display panel according to claim 17, wherein during fingerprint recognition, the light-emitting element in the fingerprint recognition region is reused as a light source for fingerprint recognition; and
    wherein during the fingerprint recognition, light emitted by the light-emitting element in the fingerprint recognition region gets into a touching body, which in turn reflects the light to form reflected light, and then the reflected light gets into the photosensitive element, and then the photosensitive element performs the fingerprint recognition based on the reflected light.

20. A display device, comprising a display panel, wherein the display panel has a display area, and at least a part of the display area is a fingerprint recognition region, wherein the display panel comprises:
a base substrate;
a plurality of pixel circuits provided on the base substrate, wherein each of the plurality of pixel circuits comprises a storage capacitor; and
a plurality of fingerprint recognition units provided on a side of the storage capacitor facing away from a light-out surface of the display panel, and a projection of the plurality of fingerprint recognition units in a direction perpendicular to the base substrate is located within the fingerprint recognition region,
wherein the storage capacitor comprises a first electrode and a second electrode disposed opposite to each other, wherein at least one of the first electrode and the second electrode is a transparent electrode.

* * * * *